(12) United States Patent
Yanai et al.

(10) Patent No.: US 6,368,749 B1
(45) Date of Patent: Apr. 9, 2002

(54) ACTIVE SUBSTANCES, ELECTRODES, NONAQUEOUS ELECTROLYTE SECONDARY CELLS, AND A PROCESS FOR FABRICATING THE ACTIVE SUBSTANCES

(75) Inventors: Atsushi Yanai, Yono; Katsunori Yanagida, Itami; Takeshi Maeda, Tsukuba; Atsuhiro Funahashi, Suita; Toshiyuki Nohma; Ikuo Yonezu, both of Hirakata, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/597,095

(22) Filed: Jun. 20, 2000

(30) Foreign Application Priority Data

Jun. 23, 1999 (JP) ............................................ 11-176974

(51) Int. Cl.$^7$ ................................................ H01M 4/58
(52) U.S. Cl. ................ 429/231.1; 429/231.1; 429/232; 429/220; 429/221; 429/223; 429/224; 429/229; 429/231.95; 429/231.6
(58) Field of Search .................... 429/231.1, 231.3, 429/220, 221, 223, 224, 229, 231.95, 231.6, 232

(56) References Cited

U.S. PATENT DOCUMENTS 5,034,291 A * 7/1991 Jacus ........................ 429/206

FOREIGN PATENT DOCUMENTS

| JP | 9-115514 A | 5/1997 |
| JP | 9-245787 A | 9/1997 |

* cited by examiner

Primary Examiner—Laura Weiner
(74) Attorney, Agent, or Firm—Kubovcik & Kubovcik

(57) ABSTRACT

The present invention provides a positive electrode of a nonaqueous electrolyte secondary cell which is prepared using an active substance containing a composition of $LiNi_aCo_bM_cO_2$ (a+b+c=1; 0≦c≦0.5) wherein M is at least one metal selected from among Mn, Fe, Zn, Ti, Cr, Mg, Al, Cu, or Ga and a composition of $AlX(SO_4)_2$ wherein X is at least one material selected from among Na, Rb, Cs, or $NH_4$. This enables the secondary cell to diminish the reduction of a cell capacity when allowed to store and thus the storage characteristics of the secondary cell is improved.

14 Claims, No Drawings

ACTIVE SUBSTANCES, ELECTRODES, NONAQUEOUS ELECTROLYTE SECONDARY CELLS, AND A PROCESS FOR FABRICATING THE ACTIVE SUBSTANCES

FIELD OF THE INVENTION

The present invention relates to active substances suitable for use as positive electrodes of nonaqueous electrolyte secondary cells, electrodes having the active substances, nonaqueous electrolyte secondary cells incorporating the electrode, and a process for fabricating the active substances.

BACKGROUND OF THE INVENTION

Nonaqueous electrolyte secondary cells comprise heretofore positive and negative electrodes capable of absorbing and desorbing lithium and nonaqueous electrolytic solution. The nonaqueous electrolyte secondary cells incorporate positive electrode active substances which are fabricated from lithium-containing metal oxide which combines lithium with metals such as nickel, cobalt, and the like. Active research has been conducted on such cells since the cells can exhibit voltage output of approximately 4 V and have large cell capacity.

However, the conventional nonaqueous electrolyte secondary cells described above have the problem that when the cell is allowed to store, the positive electrode reacts with the electrolytic solution, degrading storage characteristics. To overcome this problem, JP-A No. 9-245787, for example, proposes a positive electrode active substance containing $SO_4$ trace. Nevertheless, the nonaqueous electrolyte secondary cell incorporating the proposed positive electrode active substance still has the problem of becoming lower in discharge capacity giving the unsatisfactory storage characteristics to the cell.

SUMMARY OF THE INVENTION

An object of the present invention which has been accomplished in view of the foregoing drawbacks of the prior art is to provide active substances which, when used as the positive electrode active substances of nonaqueous electrolyte secondary cells, diminishes the reduction of its discharge capacity that would result if the cell is allowed to store, the active substances thus being suitable to give the improved storage characteristics to the cell.

Another object of the present invention is to provide an electrode which, when used as the positive electrode for a nonaqueous electrolyte secondary cell, diminishes the reduction of its discharge capacity that would result if the cell is allowed to store, the electrode thus being suitable to give the improved storage characteristics to the cell.

Still another object of the invention is to provide a nonaqueous electrolyte secondary cell which diminishes the reduction of its discharge capacity that would result when allowed to store, the nonaqueous electrolyte secondary cell thus being suitable to give the improved storage characteristics to the cell.

Further another object of the invention is to provide a process for fabricating an active substance which, when used as the positive electrode active substance of a nonaqueous electrolyte secondary cell, diminishes the reduction of its discharge capacity that would result if the cell is allowed to store, the process for fabricating an active substance thus being suitable to give the improved storage characteristics to the cell.

The present invention provides an active substance which is characterized in that the active substance contains a composition of $LiNi_aCo_bM_cO_2$ ($a+b+c=1; 0 \leq c \leq 0.5$) wherein M is at least one metal selected from among Mn, Fe, Zn, Ti, Cr, Mg, Al, Cu, or Ga and =a composition of $AlX(SO_4)_2$ wherein X is at least one material from among Na, K, Rb, Cs, or $NH_4$.

The active substance thus constructed, when used as the positive electrode active substance, exhibits small self-discharge rate to afford the improved storage characteristics to the cell. This is thought attributable to the fact that the active portion of $LiNi_aCo_bM_cO_2$ is reduced suppressing the reaction between the positive electrode active substance and the electrolytic solution to restrain degrading of the positive electrode. According to an amount of M of $LiNi_aCO_bM_cO_2$, the charge and discharge capacity may be reduced, so that the added amount of M is preferably within the range of $0 \leq c \leq 0.5$.

Further the active substance of the invention which contains at least 1.5 mole % to up to 20 mole % of $AlX(SO_4)_2$ based on the amount of said $LiNi_aCo_bM_cO_2$ is used as a positive electrode active substance of nonaqueous electrolyte secondary cells giving the cell greatly reduced self-discharge rate.

Still the active substance of the invention which contains at least 3 mole % to up to 10 mole % of $AlX(SO_4)_2$ based on the amount of said $LiNi_aCo_bM_cO_2$, is used as a positive electrode active substance of nonaqueous electrolyte secondary cells giving the cell much more greatly reduced self-discharge rate.

Further the present invention provides construction wherein surface of said $LiNi_aCo_bM_cO_2$ is coated with said $AlX(SO_4)_2$ suppressing sufficiently the reaction between $LiNi_aCo_bM_cO_2$ and the electrolytic solution.

The electrode of the present invention is further characterized in that the electrode is prepared using the active substance described. In the case where the electrode thus constructed is used as the positive electrode of the nonaqueous electrolyte secondary cell, the self-discharge rate of the cell becomes small to give the improved storage characteristics to the secondary cell.

The nonaqueous electrolyte secondary cell of the present invention is further characterized in that the cell is prepared using the positive electrode as described above. With the nonaqueous electrolyte secondary cell thus constructed, the self-discharge rate becomes small to give the improved storage characteristics.

The present invention provides a solute of an electrolytic solution of the nonaqueous electrolyte secondary cell such as $LiPF_6$, $LiBF_4$, $LiSbF_6$, $LiCF_3SO_3$, $LiAsF_6$, $LiN(CF_3SO_2)_2$, $LiCF_3(CF_2)_3SO_3$, and the like to be used. However, these examples are not limitative.

The present invention further provides a solvent of an electrolytic solution of the nonaqueous electrolyte secondary cell such as an ethylene carbonate, propylene carbonate, butylene carbonate, dimethyl carbonate, diethyl carbonate, sulfolane, 1,2-dimethoxyethane, tetrahydrofuran, 1,3-dioxolane, and the like to be used. However, these examples are not limitative.

A process for fabricating the active substance of the invention is characterized in that $LiNi_aCo_bM_cO_2$ ($a+b+c=1; 0 \leq c \leq 0.5$) wherein M is at least one metal selected from among Mn, Fe, Zn, Ti, Cr, Mg, Al, Cu, or Ga and $AlX(SO_4)_2 \cdot 12H_2O$ wherein X is at least one material from among Na, K, Rb, Cs, or $NH_4$ are mixed together to conduct heat-treatment to the mixture obtained.

According to the above process for fabricating the active substance, the active substance described is fabricated preferably. Especially when the active substance which is produced under the temperature of at least 100° C. to up to 300° C. in the above heat-treatment is used as a positive electrode active substance of the nonaqueous electrolyte secondary cell, the self discharge rate of the cell becomes greatly smaller.

DETAILED DESCRIPTION OF EMBODIMENTS

Embodiments of the invention will be described below in detail.

[Preparation of Positive Electrode Active Substance]

$AlK(SO_4)_2 \cdot 12H_2O$ was mixed with $LiCoO_2$ in the ratio of 5 mole % based on an amount of $LiCoO_2$. Thereafter the mixture obtained was subjected to the heat-treatment at 250° C. for 2 hours to prepare a positive electrode active substance.

[Preparation of Positive Electrode]

The above positive electrode active substance, carbon powder for use as an electrically conductive agent, and polytetrafluoroethylene serving as binder were mixed together in the ratio by weight of 80:10:10 to obtain a positive electrode composition. Subsequently, the mixture was molded under pressure and dried in a vacuum at 100° C. for 2 hours to prepare a positive electrode.

[Preparation of Negative Electrode]

Lithium-aluminum alloy was blanked in predetermined dimension to prepare a negative electrode.

[Preparation of Electrolytic Solution]

An electrolytic solution was prepared by dissolving $LiPF_6$ in the ratio of 1 M in a solvent mixture of ethylene carbonate and diethyl carbonate in the ratio by volume of 1:1.

[Assembly of Cell]

A positive-electrode can and a negative-electrode can each of which has a flat cylindrical shape and has an opening at one end were fabricated. While the positive electrode described above was placed on a bottom inside the positive-electrode can, the negative electrode described above was placed on a bottom inside the negative-electrode can. A separator which was impregnated with the above electrolytic solution was interposed between the negative electrode and the positive electrode, and the positive-electrode can and the negative-electrode can were interconnected by an insulator, whereby a typical structure of a coin-type cell AO was prepared. A finely porous membrane of polypropylene having ion permeability was used as the separator.

EXPERIMENT 1

An investigation was made on kinds of $AlX(SO_4)_2$ contained by the positive electrode active substance by preparing the following cells A1 to A4.

A cell A1 was fabricated in the same manner as in cell AO with the exception of using $AlNa(SO_4)_2 \cdot 12H_2O$ in place of $AlK(SO_4)_2 \cdot 12H_2O$ in a process for preparing the positive electrode active substance. A cell A2 was fabricated in the same manner as in cell AO with the exception of using $AlRb(SO_4)_2 \cdot 12H_2O$ in place of $AlK(SO_4)_2 \cdot 12H_2O$ in a process for preparing the positive electrode active substance. A cell A3 was fabricated in the same manner as in cell AO with the exception of using $AlCs(SO_4)_2 \cdot 12H_2O$ in place of $AlK(SO_4)_2 \cdot 12H_2O$ in a process for preparing the positive electrode active substance. A cell A4 was fabricated in the same manner as in cell AO with the exception of using $Al(NH_4)(SO_4)_2 \cdot 12H_2O$ in place of $AlK(SO_4)_2 \cdot 12H_2O$ in a process for preparing the positive electrode active substance.

A comparative cell XO was fabricated in the same manner as the cell AO with the exception of using $LiCoO_2$ in place of $LiCoO_2$ wherein $AlK(SO_4)_2 \cdot 12H_2O$ was mixed and was heat-treated.

The cells A0 to A4 and the comparative cell XO described above were checked for discharge capacity by charging each cell at a constant current value of 10 mA to a cell voltage of 4.2 V and thereafter discharging the cell to 3.0 V at a discharging resistance value of 1 k$\Omega$. Subsequently, the cells were charged at a constant current value of 10 mA to a cell voltage of 4.2 V, allowed to store in a thermostatic chamber at 80° C. for 60 days, then discharged to a cell voltage of 2.7 V at a discharging resistance value of 1 k$\Omega$ and thereafter checked for discharge capacity after storing. The self-discharge rate of each cell was calculated from Mathematical Expression 1 given below. Table 1 shows the result.

MATHEMATICAL EXPRESSION 1

$$\text{Self-discharge rate}(\%) = \{1 - (A/B)\} \times 100$$

wherein A is the discharge capacity after storing, and B is the discharge capacity before storing.

TABLE 1

| | KIND OF $AlX(SO_4)_2$ | $AlX(SO_4)_2$ CONTENT (mole %) | LITHIUM-CONTAINING METAL OXIDE | SELF-DISCHARGE RATE (%) |
|---|---|---|---|---|
| CELL | | | | |
| A0 | $AlK(SO_4)_2$ | 5 | $LiCoO_2$ | 5 |
| A1 | $AlNa(SO_4)_2$ | 5 | $LiCoO_2$ | 7 |
| A2 | $AlRb(SO_4)_2$ | 5 | $LiCoO_2$ | 9 |
| A3 | $AlCs(SO_4)_2$ | 5 | $LiCoO_2$ | 9 |
| A4 | $Al(NH_4)(SO_4)_2$ | 5 | $LiCoO_2$ | 8 |
| COMPARATIVE CELL | | | | |
| X0 | NONE | 0 | $LiCoO_2$ | 23 |

Table 1 reveals that the cells AO to A4 containing a composition of $LiCoO_2$ and a composition of $AlK(SO_4)_2$, $AlNa(SO_4)_2$, $AlRb(SO_4)_2$, $AlCs(SO_4)_2$, or $Al(NH_4)(SO_4)_2$ exhibit much smaller self-discharge rate than the comparative cell XO to obtain more excellent storage characteristics.

EXPERIMENT 2

An investigation was made on kinds of lithium-containing metal oxide when the positive electrode active substance was prepared with the following cells B1 to B13 and Y1 to Y13 as prepared.

A cell B1 was fabricated in the same manner as in cell AO of the invention with the exception of using $LiNiO_2$ substance in place of $LiCoO_2$ in a process for preparing the positive electrode active substance. A cell B2 was fabricated in the same manner as the cell AO with the exception of using $LiNi_{0.5}Co_{0.5}O_2$ in place of $LiCoO_2$ in a process for preparing the positive electrode active substance. A cell B3 was fabricated in the same manner as the cell AO with the exception of using $LiNi_{0.5}Mn_{0.5}O_2$ in place of $LiCoO_2$ in a process for preparing the positive electrode active substance. A cell B4 was fabricated in the same manner as the cell AO with the exception of using $LiCo_{0.5}Mn_{0.5}O_2$ in place of $LiCoO_2$ in a process for preparing the positive electrode active substance. A cell B5 was fabricated in the same manner as the cell AO with the exception of using $LiNi_{0.4}Co_{0.1}Mn_{0.5}O_2$ in place of $LiCoO_2$ in a process for preparing the positive electrode active substance. A cell B6 was fabricated in the same manner as the cell AO with the exception of using $LiNi_{0.5}Fe_{0.5}O_2$ in place of $LiCoO_2$ in a process for preparing the positive electrode active substance. A cell B7 was fabricated in the same manner as the cell AO with the exception of using $LiNi_{0.5}Zn_{0.5}O_2$ in place of $LiCoO_2$ in a process for preparing the positive electrode active substance. A cell B8 was fabricated in the same manner as the cell AO with the exception of using $LiNi_{0.5}Ti_{0.5}O_2$ in place of $LiCoO_2$ in a process for preparing the positive electrode active substance. A cell B9 was fabricated in the same manner as the cell AO with the exception of using $LiNi_{0.5}Cr_{0.5}O_2$ in place of $LiCoO_2$ in a process for preparing the positive electrode active substance. A cell B10 was fabricated in the same manner as the cell AO with the exception of using $LiNi_{0.5}Mg0.5O_2$ in place of $LiCoO_2$ in a process for preparing the positive electrode active substance. A cell B11 was fabricated in the same manner as the cell AO with the exception of using $LiNi_{0.5}Al_{0.5}O_2$ in place of $LiCoO_2$ in a process for preparing the positive electrode active substance. A cell B12 was fabricated in the same manner as the cell AO with the exception of using $LiNi_{0.5}Cu_{0.5}O_2$ in place of $LiCoO_2$ in a process for preparing the positive electrode active substance. A cell B13 of the invention with the exception of using $LiNi_{0.5}Ga_{0.5}O_2$ in place of $LiCoO_2$ in a process for preparing the positive electrode active substance.

Each of comparative cells Y1 to Y13 was fabricated in the same manner as the cells B1 to B13 with the exception that the lithium containing metal oxide did not contain $AlX(SO_4)_2$ in a process for preparing the positive electrode active substance.

The self-discharge rate of the cell AO, the cells B1 to B13, the comparative cell XO, and the cells Y1 to Y13 were calculated, respectively. The results are shown in Table 2. The self-discharge rate was calculated in the same manner as in the Experiment 1.

TABLE 2

| | KIND OF $AlX(SO_4)_2$ | $AlX(SO_4)_2$ CONTENT (mole %) | LITHIUM-CONTAINING METAL OXIDE | SELF-DISCHARGE RATE (%) |
|---|---|---|---|---|
| CELL | | | | |
| A0 | $AlK(SO_4)_2$ | 5 | $LiCoO_2$ | 5 |
| B1 | $AlK(SO_4)_2$ | 5 | $LiNiO_2$ | 7 |
| B2 | $AlK(SO_4)_2$ | 5 | $LiNi_{0.5}Co_{0.5}O_2$ | 6 |
| B3 | $AlK(SO_4)_2$ | 5 | $LiNi_{0.5}Mn_{0.5}O_2$ | 9 |
| B4 | $AlK(SO_4)_2$ | 5 | $LiCo_{0.5}Mn_{0.5}O_2$ | 9 |
| B5 | $AlK(SO_4)_2$ | 5 | $LiNi_{0.4}Co_{0.1}Mn_{0.5}O_2$ | 7 |
| B6 | $AlK(SO_4)_2$ | 5 | $LiNi_{0.5}Fe_{0.5}O_2$ | 10 |
| B7 | $AlK(SO_4)_2$ | 5 | $LiNi_{0.5}Zn_{0.5}O_2$ | 9 |
| B8 | $AlK(SO_4)_2$ | 5 | $LiNi_{0.5}Ti_{0.5}O_2$ | 9 |
| B9 | $AlK(SO_4)_2$ | 5 | $LiNi_{0.5}Cr_{0.5}O_2$ | 10 |
| B10 | $AlK(SO_4)_2$ | 5 | $LiNi_{0.5}Mg_{0.5}O_2$ | 10 |
| B11 | $AlK(SO_4)_2$ | 5 | $LiNi_{0.5}Al_{0.5}O_2$ | 8 |
| B12 | $AlK(SO_4)_2$ | 5 | $LiNi_{0.5}Cu_{0.5}O_2$ | 10 |
| B13 | $AlK(SO_4)_2$ | 5 | $LiNi_{0.5}Ga_{0.5}O_2$ | 9 |
| COMPARATIVE CELL | | | | |
| X0 | NONE | 0 | $LiCoO_2$ | 23 |
| y1 | NONE | 0 | $LiNiO_2$ | 25 |
| y2 | NONE | 0 | $LiNi_{0.5}Co_{0.5}O_2$ | 24 |
| y3 | NONE | 0 | $LiNi_{0.5}Mn_{0.5}O_2$ | 26 |
| y4 | NONE | 0 | $LiCo_{0.5}Mn_{0.5}O_2$ | 25 |
| y5 | NONE | 0 | $LiNi_{0.4}Co_{0.1}Mn_{0.5}O_2$ | 22 |
| y6 | NONE | 0 | $LiNi_{0.5}Fe_{0.5}O_2$ | 27 |
| y7 | NONE | 0 | $LiNi_{0.5}Zn_{0.5}O_2$ | 26 |
| y8 | NONE | 0 | $LiNi_{0.5}Ti_{0.5}O_2$ | 28 |
| y9 | NONE | 0 | $LiNi_{0.5}Cr_{0.5}O_2$ | 29 |
| y10 | NONE | 0 | $LiNi_{0.5}Mg_{0.5}O_2$ | 29 |
| y11 | NONE | 0 | $LiNi_{0.5}Al_{0.5}O_2$ | 26 |
| y12 | NONE | 0 | $LiNi_{0.5}Cu_{0.5}O_2$ | 29 |
| y13 | NONE | 0 | $LiNi_{0.5}Ga_{0.5}O_2$ | 28 |

As will be apparent from Table 2, cell AO and cells B1 to B13 were smaller than comparative cell XO and cells Y1 to Y13 in self-discharge rate, giving excellent storage characteristics to cell AO and cells B1 to B13. Accordingly, this indicates that the nonaqueous electrolyte secondary cell having a positive electrode active substance containing a composition of $LiNi_aCo_bM_cO_2$ ($a+b+c=1; 0 \leq c \leq 0.5$) wherein M is at least one metal selected from among Mn, Fe, Zn, Ti, Cr, Mg, Al, Cu, or Ga and a composition of $AlX(SO_4)_2$ wherein X is at least one material selected from among Na, K, Rb, Cs, or $NH_4$ affords smaller self-discharge rate and excellent storage characteristics.

Consequently, as will be apparent from Table 1 and Table 2, when the active substance containing $LiNi_aCo_bM_cO_2$ ($a+b+c=1; 0 \leq c \leq 0.5$) wherein M is at least one metal selected from among Mn, Fe, Zn, Ti, Cr, Mg, Al, Cu, or Ga and $AlK(SO_4)_2$, $AlNa(SO_4)_2$, $AlRb(SO_4)_2$, $AlCs(SO_4)_2$, or $Al(NH_4)(SO_4)_2$ was used for the positive electrode of the nonaqueous electrolyte secondary cell, the cell is given smaller self-discharge rate and improved storage characteristics.

EXPERIMENT 3

An investigation was made on an amount of $AlX(SO_4)_2$ content in the positive electrode active substance with following cells C1 to C10 as prepared.

A cell C1 was fabricated in the same manner as in cell AO with the exception of mixing 1.2 mole % of $AlK(SO_4)_2 \cdot 12H_2O$ in place of 5 mole % of $AlK(SO_4)_2 \cdot 12H_2O$ in a process for preparing the positive electrode active substance. A cell C2 was fabricated in the same manner as in cell AO with the exception of mixing 1.5 mole % of $AlK(SO_4)_2 \cdot 12H_2O$ in place of 5 mole % of $AlK(SO_4)_2 \cdot 12H_2O$ in a process for preparing the positive electrode active substance. A cell C3 was fabricated in the same manner as in cell AO with the exception of mixing 2.5 mole % of $AlK(SO_4)_2 \cdot 12H_2O$ in place of 5 mole % of $AlK(SO_4)_2 \cdot 12H_2O$ in a process for preparing the positive electrode active substance. A cell C4 was fabricated in the same manner as in cell AO with the exception of mixing 3 mole % of $AlK(SO_4)_2 \cdot 12H_2O$ in place of 5 mole % of $AlK(SO_4)_2 \cdot 12H_2O$ in a process for preparing the positive electrode active substance. A cell C5 was fabricated in the same manner as in cell AO with the exception of mixing 7 mole % of $AlK(SO_4)_2 \cdot 12H_2O$ in place of 5 mole % of $AlK(SO_4)_2 \cdot 12H_2O$ in a process for preparing the positive electrode active substance. A cell C6 was fabricated in the same manner as in cell AO with the exception of mixing 10 mole % of $AlK(SO_4)_2 \cdot 12H_2O$ in place of 5 mole % of $AlK(SO_4)_2 \cdot 12H_2O$ in a process for preparing the positive electrode active substance. A cell C7 was fabricated in the same manner as in cell AO with the exception of mixing 12 mole % of $AlK(SO_4)_2 \cdot 12H_2O$ in place of 5 mole % of $AlK(SO_4)_2 \cdot 12H_2O$ in a process for preparing the positive electrode active substance. A cell C8 was fabricated in the same manner as in cell AO with the exception of mixing 15 mole % of $AlK(SO_4)_2 \cdot 12H_2O$ in place of 5 mole % of $AlK(SO_4)_2 \cdot 12H_2O$ in a process for preparing the positive electrode active substance. A cell C9 was fabricated in the same manner as in cell AO with the exception of mixing 20 mole % of $AlK(SO_4)_2 \cdot 12H_2O$ in place of 5 mole % of $AlK(SO_4)_2 \cdot 12H_2O$ in a process for preparing the positive electrode active substance. A cell C10 was fabricated in the same manner as in cell AO with the exception of mixing 22 mole % of $AlK(SO_4)_2 \cdot 12H_2O$ in place of 5 mole % of $AlK(SO_4)_2 \cdot 12H_2O$ in a process for preparing the positive electrode active substance.

On the other hand, in a process for preparing the positive electrode active substance, cobalt sulfate aqueous solution was reacted with sodium bicarbonate aqueous solution to produce precipitation, and thereafter the precipitation obtained was filtrated, washed with water, and dried to prepare basic cobalt carbonate. The basic cobalt carbonate was given heat-treatment at 400° C. to obtain tri-cobalt tetra oxide. Said tri-cobalt tetra oxide was mixed with lithium carbonate in a specified ratio followed by reaction at 900° C. to prepare $LiCoO_2$ (containing 0.8 mole % of $SO_4$ trace; corresponding to 0.4 mole % as to $(SO_4)_2$). Comparative cell Z1 was fabricated in the same manner as in cell AO with the exception of the manner wherein the positive electrode active substance was prepared. The comparative cell Z1 corresponds to a cell disclosed on JP-A No.9-245787.

The self-discharge rate of the cell AO and the cells C1 to C10 and the comparative cells XO and Z1 were calculated, respectively. The results are shown in Table 3. The self-discharge rate was calculated in the same manner as in the Experiment 1.

TABLE 3

|  | KIND OF $AlX(SO_4)_2$ | $AlX(SO_4)_2$ CONTENT (mole %) | ACTIVE SUB-STANCE TO BE MIXED | SELF-DIS-CHARGE RATE(%) |
| --- | --- | --- | --- | --- |
| COMPAR-ATIVE CELL |  |  |  |  |
| X0 | NONE | 0 | $LiCoO_2$ | 23 |
| Z1 | MATERIAL OF COBALT SULFATE MIXED | $0.4((SO_4)_2)$ | $LiCoO_2$ | 22 |
| CELL |  |  |  |  |
| C1 | $AlK(SO_4)_2$ | 1.2 | $LiCoO_2$ | 21 |
| C2 | $AlK(SO_4)_2$ | 1.5 | $LiCoO_2$ | 15 |
| C3 | $AlK(SO_4)_2$ | 2.5 | $LiCoO_2$ | 14 |
| C4 | $AlK(SO_4)_2$ | 3.0 | $LiCoO_2$ | 9 |
| A0 | $AlK(SO_4)_2$ | 5 | $LiCoO_2$ | 5 |
| C5 | $AlK(SO_4)_2$ | 7 | $LiC9O_2$ | 8 |
| C6 | $AlK(SO_4)_2$ | 10 | $LiCoO_2$ | 1o |
| C7 | $AlK(SO_4)_2$ | 12 | $LiCoO_2$ | 12 |
| C8 | $AlK(SO_4)_2$ | 15 | $LiCoO_2$ | 13 |
| C9 | $AlK(SO_4)_2$ | 20 | $LiCoO_2$ | 15 |
| C10 | $AlK(SO_4)_2$ | 22 | $LiCoO_2$ | 21 |

As will be apparent from Table 3, in the case where the active substance contained $AlK(SO_4)_2$ in an amount of at least 1.5 mole % to up to 20 mole %, the cells as tested were given more greatly reduced self-discharge rate than comparative cells XO and Z1 to afford the improved storage characteristics. Especially in the case where the above $AlK(SO_4)_2$ content was at least 3.0 mole % to up to 10 mole %, the self-discharge rate became much more reduced to afford more improved storage characteristics. The reason why the reduction of self-discharge rate was diminished when $AlK(SO_4)_2$ was contained in an amount of 22 mole % is thought attributable to the fact that $AlK(SO_4)_2$ acts as an impurity to give the cell the increased self-discharge rate.

Further, in the case where $AlNa(SO_4)_2$, $AlRb(SO_4)_2$, $AlCs(SO_4)_2$, or $Al(NH_4)(SO_4)_2$ for use in Experiment 1 was used in place of $AlK(SO_4)_2$, and in the case where lithium containing metal oxide, $LiNi_aCO_bM_cO_2$ (a+b+c=1;0≦c≦0.5) wherein M is at least one metal selected from among Mn, Fe, Zn, Ti, Cr, Mg, Al, Cu, or Ga, an investigation was made on an amount of $AlX(SO_4)_2$ contained. Accordingly, the same result as shown in Table 3 described was obtained.

EXPERIMENT 4

An investigation was made on the heat-treatment temperature in a process for preparing the positive electrode active substance with the following cells D1 to D5 as prepared.

A cell D0 was fabricated in the same manner as in cell AO with the exception of conducting the heat-treatment at 80° C. in place of conducting the heat-treatment at 250° C. in a process for preparing the positive electrode active substance. A cell D1 was fabricated in the same manner as in cell AO with the exception of conducting the heat-treatment at 100° C. in place of conducting the heat-treatment at 250° C. in a process for preparing the positive electrode active substance. A cell D2 was fabricated in the same manner as in cell AO with the exception of conducting the heat-treatment at 150° C. in place of conducting the heat-treatment at 250° C. in a process for preparing the positive electrode active substance. A cell D3 was fabricated in the same manner as in cell AO with the exception of conducting the heat-treatment at 200° C. in place of conducting the heat-treatment at 250° C. in a process for preparing the positive electrode active substance. A cell D4 was fabricated in the same manner as in cell AO with the exception of conducting the heat-treatment at 300° C. in place of conducting the heat-treatment at 250° C. in a process for preparing the positive electrode active substance. A cell D5 was fabricated in the same manner as in cell AO with the exception of conducting the heat-treatment at 350° C. in place of conducting the heat-treatment at 250° C. in a process for preparing the positive electrode active substance.

The self-discharge rate of the above cells DO to D5 were calculated, respectively. The results are shown in Table 4. The self-discharge rate was calculated in the same manner as in the Experiment 1.

TABLE 4

| KIND OF $AlX(SO_4)_2$ | TEMPER-ATURE OF HEAT-TREAT-MENT (° C.) | LITHIUM-CON-TAINING METAL OXIDE | SELF-DIS-CHARGE RATE (%) |
| --- | --- | --- | --- |
| CELL |  |  |  |
| D0 | 5 mole % $AlK(SO_4)_2$ | 80 | $LiCoO_2$ | 15 |
| D1 | 5 mole % $AlK(SO_4)_2$ | 100 | $LiCoO_2$ | 10 |
| D2 | 5 mole % $AlK(SO_4)_2$ | 150 | $LiCoO_2$ | 9 |

TABLE 4-continued

| | KIND OF AlX(SO$_4$)$_2$ | TEMPERATURE OF HEAT-TREATMENT (° C.) | LITHIUM-CONTAINING METAL OXIDE | SELF-DISCHARGE RATE (%) |
|---|---|---|---|---|
| D3 | 5 mole % AlK(SO$_4$)$_2$ | 200 | LiCoO$_2$ | 6 |
| A0 | 5 mole % AlK(SO$_4$)$_2$ | 250 | LiCoO$_2$ | 5 |
| D4 | 5 mole % AlK(SO$_4$)$_2$ | 300 | LiCoO$_2$ | 10 |
| D5 | 5 mole % AlK(SO$_4$)$_2$ | 350 | LiCoO$_2$ | 15 |

As will be apparent from Table 4, when the heat-treatment temperature is in the range of at least 100° C. to up to 300° C., the cells as tested were given more greatly reduced self-discharge to afford particularly improved storage characteristics. This is thought attributable to the fact that a surface of LiCo O$_2$ was preferably coated with AlK(SO$_4$)$_2$ to suppress the reaction between LiCoO$_2$ and the electrolytic solution sufficiently.

The present invention provides an active substance which is useful as the positive electrode active substance of nonaqueous electrolyte secondary cells to diminish the reduction in discharge capacity that would result if the cell is allowed to store, and which is suitable for giving improved storage characteristics to the cell.

The invention also provides a electrode which is useful as the positive electrode of nonaqueous electrolyte secondary cells to diminish the reduction in discharge capacity that would result if the cell is allowed to store, and which is suitable for giving improved storage characteristics to the cell.

The present invention further provides an nonaqueous electrolyte secondary cell which is useful for diminishing the reduction in discharge capacity that would result if the cell is allowed to store, and which is suitable for giving improved storage characteristics to the cell.

The invention provides a process for fabricating an active substance which is useful as the positive electrode active substance of nonaqueous electrolyte secondary cells to diminish the reduction in discharge capacity that would result if the cell is allowed to store, and which is suitable for giving improved storage characteristics to the cell.

The invention is not limited to the foregoing embodiments or examples in structure or feature but can be modified variously without departing from the spirit of the invention as set forth in claims.

What is claimed is:

1. An active substance for an electrode containing LiNi$_a$Co$_b$M$_c$O$_2$ (a+b+c=1; 0≦c≦0.5) wherein M is at least one metal selected from the group consisting of Mn, Fe, Zn, Ti, Cr, Mg, Al, Cu, and Ga and AlX(SO$_4$)$_2$ wherein X is at least one material selected from the group consisting of Na, K, Rb, Cs, and NH$_4$.

2. An active substance for an electrode according to claim 1 wherein the active substance contains at least 1.5 mole % to up to 20 mole % of said AlX(SO$_4$)$_2$ based on an amount of said LiNi$_a$Co$_b$M$_c$O$_2$.

3. An active substance for an electrode according to claim 2 wherein the active substance contains at least 3 mole % to up to 10 mole % of said AlX(SO$_4$)$_2$ based on an amount of said LiN$_a$Co$_b$M$_c$O$_2$.

4. An active substance for an electrode according to claim 1 wherein a surface of said LiNi$_a$Co$_b$M$_c$O$_2$ is coated with said AlX(SO$_4$)$_2$.

5. An electrode comprising an active substance containing LiNi$_a$Co$_b$M$_c$O$_2$ (a+b+c=1; 0≦c≦0.5) wherein M is at least one metal selected from the group consisting of Mn, Fe, Zn, Ti, Cr, Mg, Al, Cu, and Ga and AlX(SO$_4$)$_2$ wherein X is at least one material selected from the group consisting of Na, K, Rb, Cs, and NH$_4$.

6. An electrode according to claim 5 wherein the active substance contains at least 1.5 mole % to up to 20 mole % of said AlX(SO$_4$)$_2$ based on an amount of said LiNi$_a$Co$_b$M$_c$O$_2$.

7. An electrode according to claim 6 wherein the active substance contains at least 3 mole % to up to 10 mole % of said AlX(SO$_4$)$_2$ based on an amount of said LiNi$_a$Co$_b$M$_c$O$_2$.

8. An electrode according to claim 5 wherein a surface of said LiNi$_a$Co$_b$M$_c$O$_2$ is coated with said AlX(SO$_4$)$_2$.

9. A nonaqueous electrolyte secondary cell comprising a positive electrode, a negative electrode, and a nonaqueous electrolytic solution, wherein the positive electrode comprises an active substance containing LiNi$_a$Co$_b$M$_c$O$_2$ (a+b+c=1; 0≦c≦0.5) wherein M is at least one metal selected from the group consisting of Mn, Fe, Zn, Ti, Cr, Mg, Al, Cu, and Ga and AlX(SO$_4$)$_2$ wherein X is at least one material selected from the group consisting of Na, K, Rb, Cs, and NH$_4$.

10. A nonaqueous electrolyte secondary cell according to claim 9 wherein the active substance contains at least 1.5 mole % to up to 20 mole % of said AlX(SO$_4$)$_2$ based on an amount of said LiNi$_a$Co$_b$M$_c$O$_2$.

11. A nonaqueous electrolyte secondary cell according to claim 10 wherein the active substance contains at least 3 mole % to up to 10 mole % of said AlX(SO$_4$)$_2$ based on an amount of said LiNi$_a$Co$_b$M$_c$O$_2$.

12. A nonaqueous electrolyte secondary cell according to claim 9 wherein a surface of said LiNi$_a$Co$_b$M$_c$O$_2$ is coated with said AlX(SO$_4$)$_2$.

13. A process for fabricating an active substance for an electrode wherein LiNi$_a$Co$_b$M$_c$O$_2$ (a+b+c=1; 0≦c≦0.5) wherein M is at least one metal selected from the group consisting of Mn, Fe, Zn, Ti, Cr, Mg, Al, Cu, and Ga and AlX(SO$_4$)$_2$·12H$_2$O wherein X is at least one material selected from the group consisting of Na, K, Rb, Cs, and NH$_4$ are mixed together to obtain a mixture, and the mixture obtained is subjected to heat-treatment.

14. A process for fabricating an active substance for an electrode according to claim 13 wherein the temperature of said heat-treatment is in the range of at least 100° C. to up to 300° C.

* * * * *

UNITED STATES PATENT AND TRADEMARK OFFICE
CERTIFICATE OF CORRECTION

PATENT NO. : 6,368,749 B1
DATED : April 9, 2002
INVENTOR(S) : Atsushi Yanai et al.

It is certified that error appears in the above-identified patent and that said Letters Patent is hereby corrected as shown below:

<u>Title page,</u>
Item [*] Notice should read:
-- Subject to any disclaimer, the term of this patent is extended or adjusted under
35 U.S.C. §154(b) by 86 days. --

Signed and Sealed this

Seventh Day of January, 2003

JAMES E. ROGAN
*Director of the United States Patent and Trademark Office*